(12) United States Patent
Montero et al.

(10) Patent No.: US 11,809,296 B2
(45) Date of Patent: Nov. 7, 2023

(54) PROVIDING A VERBALIZED DIAGNOSTIC MESSAGE TO A USER OF AN INFORMATION HANDLING SYSTEM

(71) Applicant: Dell Products L.P., Round Rock, TX (US)

(72) Inventors: Adolfo S. Montero, Pflugerville, TX (US); Ibrahim Sayyed, Georgetown, TX (US); Srinivasa Rao Samineni, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 341 days.

(21) Appl. No.: 17/232,894

(22) Filed: Apr. 16, 2021

(65) Prior Publication Data

US 2022/0334943 A1 Oct. 20, 2022

(51) Int. Cl.
*G06F 11/32* (2006.01)
*G06F 3/16* (2006.01)
*G10L 13/02* (2013.01)

(52) U.S. Cl.
CPC ............ *G06F 11/328* (2013.01); *G06F 3/167* (2013.01); *G10L 13/02* (2013.01)

(58) Field of Classification Search
CPC ......... G06F 11/328; G06F 3/167; G10L 13/02
See application file for complete search history.

(56) References Cited

U.S. PATENT DOCUMENTS 6,279,125 B1 * 8/2001 Klein .................. G06F 11/2257
714/39

6,668,219 B2 * 12/2003 Hwang ............... G01M 17/007
340/438

OTHER PUBLICATIONS

Black, Alan. "Flite: a small run-time synthesizer.", 2001.
SW320022-1HPM-PIC32 Compact MP3 Decoder Library for Harmony, https://www.microchip.com/en-us/development-tool/sw320022-1hpm#, Retrieved Nov. 17, 2021.
"Flite: a small, fast run time synthesis engine." Speech Software at CMU, http://www.speech.cs.cmu.edu/flite/index.html, Retrieved Nov. 17, 2021.
Text2Speech.org, https://www.text2speech.org/, Retrieved Nov. 17, 2021.

(Continued)

*Primary Examiner* — Nadeem Iqbal
(74) *Attorney, Agent, or Firm* — McDermott Will & Emery LLP

(57) ABSTRACT

In one embodiment, a method for providing a verbalized diagnostic message to a user of an information handling system includes: determining, by an embedded controller, an error associated with the information handling system; accessing, by the embedded controller, a memory device of the information handling system, the memory device storing a plurality of diagnostic files; selecting, by the embedded controller, a diagnostic file from the plurality of diagnostic files, the diagnostic file indicating the error associated with the information handling system; generating, by the embedded controller, the verbalized diagnostic message; sending, by the embedded controller, the verbalized diagnostic message to an audio device of the information handling system in an embedded controller audio stream; and presenting, by the audio device, the verbalized diagnostic message to the user via one or more speakers of the information handling system.

18 Claims, 4 Drawing Sheets

(56) References Cited

OTHER PUBLICATIONS

"Understanding Beep Codes on a Dell Desktop Personal Computer." Dell Technologies, Article No. 000124349, https://www.dell.com/support/kbdoc/en-us/000124349/understanding-beep-codes-on-a-dell-desktop-pc, Retrieved Nov. 17, 2021.

Guide for people who are blind or low Vision, Microsoft, https://support.microsoft.com/en-us/windows/guide-for-people-who-are-blind-or-low-vision-11c8b979-f8cd-f65e-6406-6f03b613b94b, Retrieved Nov. 17, 2021.

* cited by examiner

PROVIDING A VERBALIZED DIAGNOSTIC MESSAGE TO A USER OF AN INFORMATION HANDLING SYSTEM

BACKGROUND

Field of the Disclosure

The disclosure relates generally to information handling systems, and in particular to providing a verbalized diagnostic message to a user of an information handling system.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

In one embodiment, a method for providing a verbalized diagnostic message to a user of an information handling system includes: determining, by an embedded controller (EC) of the information handling system, an error associated with the information handling system; accessing, by the EC, a memory device of the information handling system via a first bus, the memory device storing a plurality of diagnostic files, the first bus communicably coupling the EC to the memory device; selecting, by the EC, a diagnostic file from the plurality of diagnostic files, the diagnostic file indicating the error associated with the information handling system; generating, by the EC, the verbalized diagnostic message; sending, by the EC, the verbalized diagnostic message to an audio device of the information handling system in an audio stream via a second bus, the second bus communicably coupling the EC to the audio device; and presenting, by the audio device, the verbalized diagnostic message to the user via one or more speakers of the information handling system.

In one or more of the disclosed embodiments, each of the plurality of diagnostic files comprises a diagnostic text file.

In one or more of the disclosed embodiments, generating the verbalized diagnostic message includes: retrieving, by the EC, the diagnostic text file and a text-to-speech (TTS) service from an EC region of the memory device via the first bus; storing, by the EC, the diagnostic text file and the TTS service in a memory of the EC; and executing, by the EC, the TTS service using the diagnostic text file as input, the TTS service generating the verbalized diagnostic message as output.

In one or more of the disclosed embodiments, each of the plurality of diagnostic files comprises a diagnostic audio file.

In one or more of the disclosed embodiments, generating the verbalized diagnostic message includes: retrieving, by the EC, the diagnostic audio file and an audio file decoder service from an EC region of the memory device via the first bus; storing, by the EC, the diagnostic audio file and the audio file decoder service in a memory of the EC; and executing, by the EC, the audio file decoder service using the diagnostic audio file as input, the audio file decoder service generating the verbalized diagnostic message as output.

In one or more of the disclosed embodiments, accessing the memory device via the first bus includes: bypassing, by the EC, a third bus communicably coupling the EC to a platform controller hub (PCH) of the information handling system.

In one or more of the disclosed embodiments, selecting the diagnostic file from the plurality of diagnostic files includes: identifying, by the EC, a numeric error indicator associated with the error; identifying, by the EC, a numeric diagnostic indicator associated with the diagnostic file; and determining, by the EC, that the numeric error indicator matches the numeric diagnostic indicator.

In one or more of the disclosed embodiments, determining the error associated with the information handling system includes: determining, by the EC, that a processor subsystem of the information handling system is in an off state; and executing, by the EC, a diagnostic test sequence stored in a memory of the EC, the diagnostic test sequence indicating the error associated with the information handling system.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF PARTICULAR EMBODIMENT(S)

Figure 1:
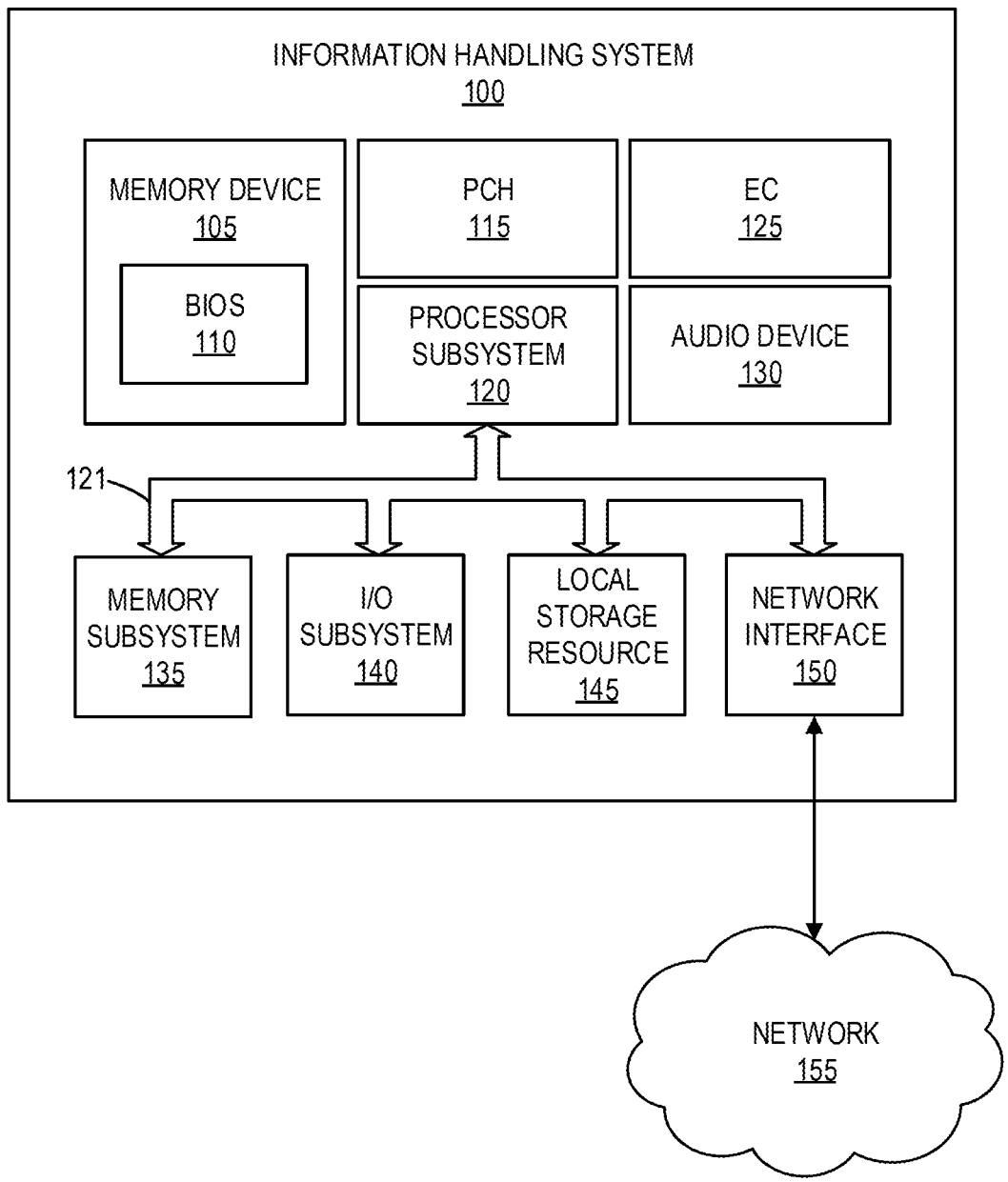
FIG. 1 is a block diagram of selected elements of an embodiment of a computing environment that includes an information handling system.

This document describes a method for providing a verbalized diagnostic message to a user of an information handling system that includes: determining, by an embedded controller (EC) of the information handling system, an error associated with the information handling system; accessing, by the EC, a memory device of the information handling system via a first bus, the memory device storing a plurality of diagnostic files, the first bus communicably coupling the EC to the memory device; selecting, by the EC, a diagnostic file from the plurality of diagnostic files, the diagnostic file indicating the error associated with the information handling system; generating, by the EC, the verbalized diagnostic message; sending, by the EC, the verbalized diagnostic message to an audio device of the information handling system in an audio stream via a second bus, the second bus communicably coupling the EC to the audio device; and presenting, by the audio device, the verbalized diagnostic message to the user via one or more speakers of the information handling system.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Particular embodiments are best understood by reference to FIGS. 1-4 wherein like numbers are used to indicate like and corresponding parts.

Turning now to the drawings, FIG. 1 is a block diagram of selected elements of an embodiment of a computing environment that includes an information handling system. Specifically, FIG. 1 illustrates a block diagram depicting selected elements of an information handling system 100 in accordance with some embodiments of the present disclosure. In other embodiments, information handling system 100 may represent different types of portable information handling systems, such as, display devices, head mounted displays, head mount display systems, smart phones, tablet computers, notebook computers, media players, foldable display systems, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems.

In the embodiment illustrated in FIG. 1, components of information handling system 100 may include, but are not limited to, a processor subsystem 120, which may comprise one or more processors, and system bus 121 that communicatively couples various system components to processor subsystem 120 including, for example, a memory subsystem 135, an I/O subsystem 140, a local storage resource 145, and a network interface 150. System bus 121 may represent a variety of suitable types of bus structures (e.g., a memory bus, a peripheral bus, or a local bus) using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus. As shown in FIG. 1, information handling system 100 may additionally include a memory device 105, a platform controller hub (PCH) 115, an embedded controller (EC) 125, and an audio device 130. Memory device 105 may include a basic input/output system (BIOS) 110. In other embodiments, computing environment 160 may include additional, fewer, and/or different components than the components shown in FIG. 1.

In information handling system 100, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 135 and/or another component of information handling system 100). In one embodiment, processor subsystem 120 may interpret and/or execute BIOS firmware stored in one or more memory devices of information handling system 100. For example, processor subsystem 120 may retrieve BIOS 110 stored in BIOS region 210 (shown in FIG. 2) of memory device 105 and may store BIOS 110 in system memory 230 such that processor subsystem 120 may interpret and/or execute BIOS 110 accordingly. In the same or alternative embodiments, processor subsystem 120 may interpret and/or execute program instructions and/or process data stored remotely. In one embodiment, processor subsystem 120 may be or include a multi-core processor comprised of one or more processor cores disposed upon an integrated circuit (IC) chip. In other embodiments, processor subsystem 120 may be or include an integrated device (e.g., microcontroller, system on a chip (SoC), and the like) that includes memory, peripheral interfaces, and/or other components suitable for interpreting and/or executing program instructions and/or processing data. Processor subsystem 120 is described in further detail with respect to FIG. 2.

In one embodiment, memory subsystem 135 may comprise a system, device, or apparatus operable to retain and/or retrieve program instructions and/or data for a period of time (e.g., computer-readable media). Memory subsystem 135 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In one embodiment, I/O subsystem 140 may comprise a system, device, or apparatus generally operable to receive and/or transmit data to, from, and/or within information handling system 100. I/O subsystem 140 may represent, for example, a variety of communication interfaces, graphics interfaces, video interfaces, user input interfaces, and/or peripheral interfaces. In various embodiments, I/O subsystem 140 may be used to support various peripheral devices, such as a touch panel, a display adapter, a keyboard, an accelerometer, a touch pad, a gyroscope, an IR sensor, a microphone, a sensor, a camera, or another type of peripheral device.

In one embodiment, local storage resource 145 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data.

In one embodiment, network interface 150 may be a suitable system, apparatus, or device operable to serve as an interface between information handling system 100 and a network 155. Network interface 150 may enable information handling system 100 to communicate over network 155 using a suitable transmission protocol and/or standard, including, but not limited to, transmission protocols and/or standards enumerated below with respect to the discussion of network 155. Network 155 may be a public network or a private (e.g. corporate) network. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 150 may enable wired and/or wireless communications (e.g., NFC or Bluetooth) to and/or from information handling system 100.

In particular embodiments, network 155 may include one or more routers for routing data between client information handling systems 100 and server information handling systems 100. A device (e.g., a client information handling system 100 or a server information handling system 100) on network 155 may be addressed by a corresponding network address including, for example, an Internet protocol (IP) address, an Internet name, a Windows Internet name service (WINS) name, a domain name or other system name. In particular embodiments, network 155 may include one or more logical groupings of network devices such as, for example, one or more sites (e.g. customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet or a broadband WAN connection including DSL, Cable, Ti, T3, Fiber Optics, Wi-Fi, or a mobile network connection including GSM, GPRS, 3G, or WiMax.

In one embodiment, network 155 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 155 and its various components may be implemented using hardware, software, or any combination thereof.

In one embodiment, memory device 105 may be a suitable system, apparatus, or device operable to store information associated with information handling system 100. In particular, memory device 105 may be or include a non-volatile solid-state storage device (e.g., flash memory) comprised of multiple partitions, or regions. Each region may store software and/or firmware used by respective devices and/or services of information handling system 100 to manage various resources and/or perform specific tasks. In one embodiment, memory device 105 may include an EC region (e.g., EC region 200 shown in FIG. 2) used to store resources associated with EC 125. EC 125 may retrieve and execute the resources to support various system tasks on behalf of information handling system 100. For example, EC 125 may access the EC region of memory device 105 via one or more busses of information handling system 100 to retrieve EC firmware used to manage one or more devices of information handling system 100. In another embodiment, memory device 105 may include a BIOS region (e.g., BIOS region 210 shown in FIG. 2) used to store resources associated with BIOS 110. Here, BIOS 110 may retrieve and execute the resources to manage hardware resources for information handling system 100. For example, processor subsystem 120 may execute BIOS 110 in a system memory of information handling system 100 such that BIOS 110 may access the BIOS region of memory device 105 via PCH 115 to retrieve BIOS firmware and perform hardware initialization during a booting process.

In one embodiment, memory device 105 may store one or more compressed files, or "diagnostic files," used to diagnose and/or convey failures or issues associated with information handling system 100. For example, diagnostic files stored in memory device 105 may be used to convey one or more failures or issues associated with information handling system 100 identified by diagnostic firmware instructions, or a "diagnostic test sequence," executed by EC 125 and/or BIOS 110. In one embodiment, diagnostic files may be or include one or more text-based files, or "diagnostic text files." In this embodiment, each diagnostic text file stored in memory device 105 may be or include a text file or document (e.g., .doc, .docx, .odt, .pdf, .rtf, and the like) that includes a text-based diagnostic message to the user indicating one or more failures or issues. For example, a diagnostic text file may be or include a plain text file (.txt) that includes a diagnostic message having a string data type. In another embodiment, diagnostic files may be or include one or more audio-based files, or "diagnostic audio files." In this embodiment, each diagnostic audio file stored in memory device 105 may be or include an audio file (e.g., MP3, WAV, AIFF, WMA, and the like) that recites an audio-based diagnostic message to the user indicating one or more failures or issues. For example, a diagnostic audio file may be or include an MP3 audio file that includes a diagnostic message encoded as strings of bits within multiple frames comprising the MP3 audio file. In one embodiment, memory device 105 may be or include a Serial Peripheral Interface (SPI) flash memory medium. In other embodiments, memory device 105 may be or include a storage array, a solid-state disk (SSD) flash drive, an all-flash array, a non-volatile memory express (NVMe) interface, a hybrid flash storage device, a hard drive storage device, and/or any combination of storage devices suitable for storing information associated with information handling system 100.

In one embodiment, basic input/output system (BIOS) 110 may be a suitable system, apparatus, or device operable to manage resources for information handling system 100. In particular, BIOS 110 may be or include a set of firmware instructions electronically stored within information handling system 100 (e.g., stored in memory device 105) that allows information handling system 100 to manage various resources and/or perform specific tasks. For example, information handling system 100 may use BIOS 110 to perform hardware initialization during a pre-boot sequence and/or to provide runtime services for other host services executing on information handling system 100. In one embodiment, BIOS 110 may be executed by processor subsystem 120 and may generate a diagnostic testing sequence, or a power-on self-test (POST), to detect, examine, and/or initialize one or more devices within, or communicably coupled to, information handling system 100. Results of the POST may be displayed to a user via a display of information handling system 100, allowing the user to identify devices and/or services that may be experiencing failures or issues during initialization. However, for instances in which the display itself may be experiencing failures or issues during initialization, such results of the POST may not be properly displayed to the user.

Conventionally, BIOS firmware may instead use one or more indicator lamps (e.g., light-emitting diodes) and/or speakers of information handling system 100 to convey failures or issues identified during a POST to the user as sequences of flashes and/or beeps, respectively. However, such sequences of flashes and/or beeps may appear cryptic to a user, requiring the user to consult a manual or website, or to contact a customer service agent or manufacturer to identify and properly decipher the diagnostic messages contained within the sequences of flashes and/or beeps. In contrast, BIOS 110 may generate a speech-based indicator, or "vocalized diagnostic message," to explicitly convey any failures or issues associated with information handling system 100 identified during a diagnostic test sequence (e.g., a POST). For example, BIOS 110 may identify a failure or issue with a system memory of information handling system 100 during a POST and may generate a vocalized diagnostic message to be presented to a user via one or more speakers of information handling system 100. In this example, such a vocalized diagnostic message may audibly recite a message such as "System boot error: bad memory DIMM" to the user. Here, BIOS 110 may cause information handling system 100 to audibly replicate, or otherwise generate, the sound of a human voice via one or more speakers (e.g., speaker 290 shown in FIG. 2) to explicitly convey instances of failures or issues associated with information handling system 100 during initialization. In one embodiment, BIOS 110 may provide one or more vocalized diagnostic messages, or a series thereof, to a user to guide the user through a BIOS recovery process, thereby avoiding cryptic flashes and/or beeps and improving overall user experience. BIOS 110 is described in further detail with respect to FIG. 2.

In one embodiment, PCH 115 may be a suitable system, apparatus, or device operable to manage various data paths and functions associated with processor subsystem 120. In particular, PCH 115 may support general-purpose input/output (GPIO) and enable communication between processor subsystem 120, EC 125, memory device 105, and audio device 130. In one embodiment, PCH 115 may be communicably coupled to processor subsystem 120 (e.g., via bus 280 shown in FIG. 2) such that PCH 115 may receive an audio stream generated by BIOS 110 in system memory and may send the audio stream to audio device 130 for presentation to a user of information handling system 100. PCH 115 is described in further detail with respect to FIG. 2.

In one embodiment, embedded controller (EC) 125 may be a suitable system, apparatus, or device operable to support various system tasks on behalf of information handling system 100. In particular, EC 125 may be or include an electronic hardware device (e.g. a microcontroller) operable to perform hardware initialization during a pre-boot sequence of information handling system 100 and to identify any failures or issues that may occur during initialization. In one embodiment, EC 125 may execute firmware instructions (e.g., stored in memory 220 shown in FIG. 2) that allows EC 125 to generate a diagnostic testing sequence used to detect, examine, and/or initialize one or more devices within, or communicably coupled to, information handling system 100. In one embodiment, such a diagnostic testing sequence may be generated prior to the POST generated by BIOS 110 described above (i.e., in a pre-POST environment). For example, EC 125 may power on and generate a diagnostic testing sequence to determine whether BIOS 110 is loading, has been loaded, or is otherwise executing, to generate a POST for information handling system 100. Because EC 125 may generate a diagnostic testing sequence in a pre-POST environment where one or more devices within, or communicably coupled to, information handling system 100 may not yet be initialized, failures or issues detected by the diagnostic testing sequence may not be visually displayed to a user (e.g., via a display).

Conventionally, EC firmware may use one or more indicator lamps (e.g., light-emitting diodes) and/or speakers of information handling system 100 to convey failures or issues identified during a diagnostic test sequence to the user as sequences of flashes and/or beeps, respectively. As described above, such sequences of flashes and/or beeps may appear cryptic to a user, requiring the user to consult a manual or website, or to contact a customer service agent or manufacturer to identify and properly decipher the diagnostic messages contained within the sequences of flashes and/or beeps. In contrast, EC 125 may generate a vocalized diagnostic message to explicitly convey failures or issues associated with information handling system 100 identified during a diagnostic test sequence (e.g., pre-POST test sequence). For example, EC 125 may identify a failure or issue with a power rail within system memory of information handling system 100 during a pre-POST diagnostic test sequence and may generate a vocalized diagnostic message to be presented to a user via one or more speakers of information handling system 100. In this example, such a vocalized diagnostic message may audibly recite a message such as "System boot error: bad system memory" to the user. Here, EC 125 may cause information handling system 100 to audibly replicate, or otherwise generate, the sound of a human voice via one or more speakers (e.g., speaker 290 shown in FIG. 2) to explicitly convey instances of failures or issues associated with information handling system 100 during initialization. EC 125 is described in further detail with respect to FIG. 2.

In one embodiment, audio device 130 may be a suitable system, apparatus, or device operable to present a verbalized diagnostic message to a user of information handling system 100. In particular, audio device 130 may be or include a hardware device (e.g., an integrated circuit, microcontroller, and the like) operable to encode and/or decode a digital audio stream for presentation to a user. In one embodiment, audio device 130 may include software instructions used to compress and/or decompress digital audio data (e.g., a verbalized diagnostic message) received in a digital audio stream according to a given audio file format (e.g., MP3 audio file, WAV audio file, and the like) and/or streaming media audio coding format. In one embodiment, audio device 130 may be or include a digital-to-analog (DAC) converter used to decode digital audio streams into analog audio signals to be presented to a user via one or more speakers communicably coupled to information handling system 100. For example, audio device 130 may receive a verbalized diagnostic message from EC 125 in a digital audio stream via bus 260 (shown in FIG. 2) and may decode the digital audio stream into an analog audio signal. In another example, audio device 130 may receive a verbalized diagnostic message from PCH 115 via bus 240 (shown in FIG. 2) and may decode the digital audio stream into an analog audio signal. In the examples above, audio device 130 may present the analog audio signal to the user via one or more speakers 290 (shown in FIG. 2) of information handling system 100. In one embodiment, audio device 130 may be or include an audio coder-decoder (codec) used to encode and/or decode a digital audio stream. In other embodiments, audio device 130 may be or include a sound card (e.g., motherboard sound chip, standard sound card, external sound adapter, and the like) within, or communicably coupled to, information handling system 100. Audio device 130 is described in further detail with respect to FIG. 2.

Figure 2:
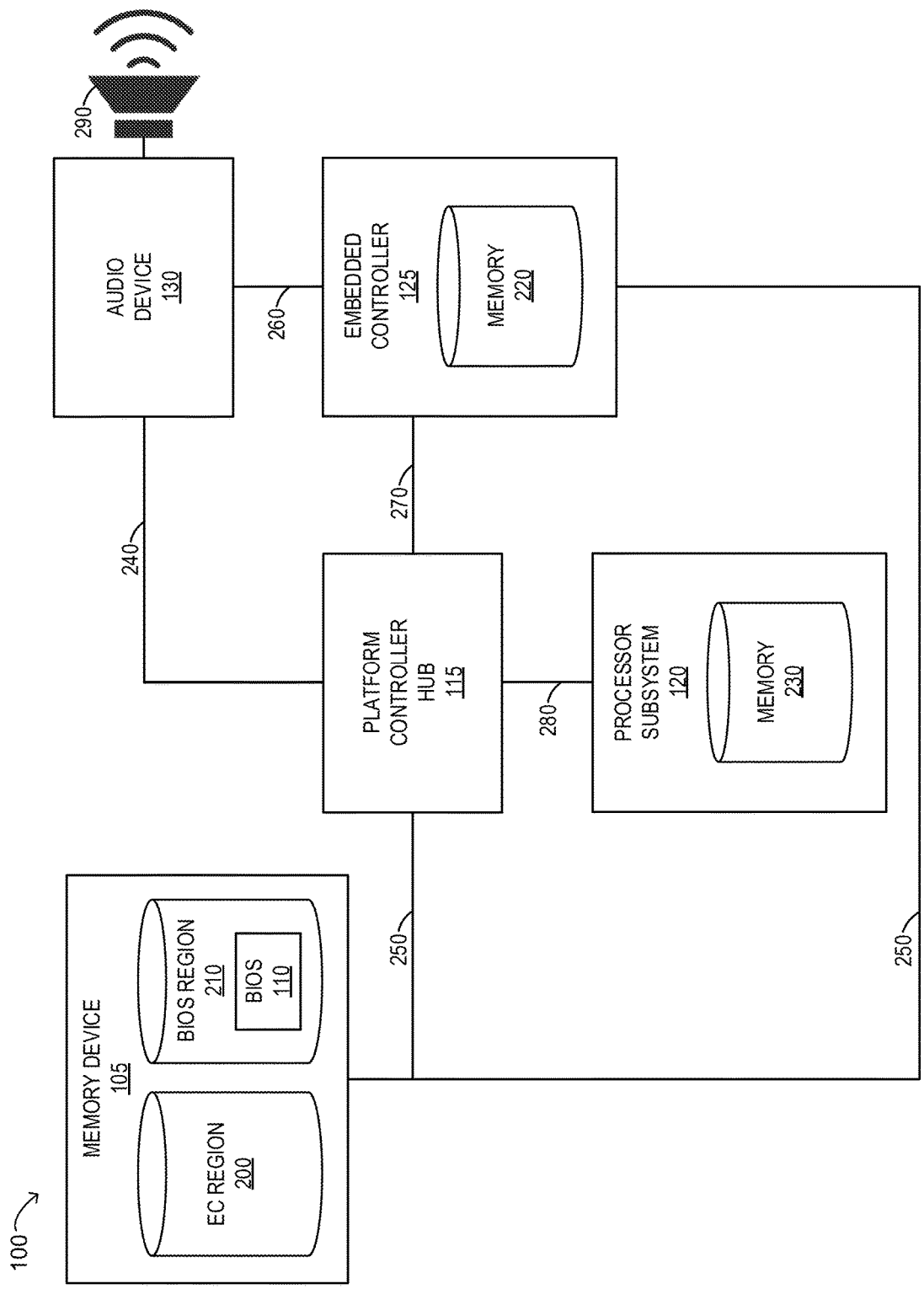
FIG. 2 is a block diagram of selected elements of an embodiment of an information handling system.

FIG. 2 is a block diagram of selected elements of an embodiment of an information handling system. In the embodiment illustrated in FIG. 2, processor subsystem 120 may be communicably coupled to PCH 115 via bus 280. PCH 115 may additionally be communicably coupled to memory device 105, audio device 130, and EC 125 via busses 250, 240, and 270, respectively. Audio device 130 may be communicably coupled to EC 125 via bus 260. EC may additionally be communicably coupled to memory device 105 via bus 250. In one embodiment, bus 280 may be or include a Peripheral Component Interconnect (PCI) bus. In another embodiment, bus 280 may be or include a Direct Memory Interface (DMI) bus. In one embodiment, bus 270 may be or include an enhanced Serial Peripheral Interface (eSPI) bus. In one embodiment, bus 260 may be or include an Inter-Integrated Circuit (I2C) bus. In another embodiment, bus 260 may be or include one or more GPIO pins. In yet another embodiment, bus 260 may be or include an Inter-IC Sound (I2S) bus. In one embodiment, bus 250 may be or include a Serial Peripheral Interface (SPI) bus. In one embodiment, bus 240 may be or include an audio cable or sound wire. In other embodiments, busses 240, 250, 260, and 270 may be or include any combination of busses, interfaces, circuits, and/or pins suitable for communicably coupling the components of information handling system 100 illustrated in FIG. 2.

In one embodiment, processor subsystem 120 may be in an off state. In this embodiment, EC 125 may identify that processor subsystem 120 is in an off state, or is otherwise unavailable, such that information handling system 100 may not complete a booting process. As described above with respect to FIG. 1, EC 125 may generate a diagnostic testing sequence used to detect, examine, and/or initialize one or more devices within, or communicably coupled to, information handling system 100. Based on results of the diagnostic testing sequence, EC 125 may determine an error associated with information handling system 100. For example, a diagnostic testing sequence generated by EC 125 may indicate that processor subsystem 120 is in an off state, or is otherwise unavailable, and that BIOS 110 has not yet loaded, or otherwise executed, to generate a POST for information handling system 100. In one embodiment, respective errors determined by EC 125 (e.g., based on the diagnostic testing sequence) may each be associated with a numeric value, or a "numeric error indicator." In this embodiment, EC 125 may use the numeric error indicators associated with respective errors, in part, to select a diagnostic file indicating the error associated with information handling system 100 to be presented to the user.

In one embodiment, EC 125 may access memory device 105 to retrieve a diagnostic file indicating the error associated with information handling system 100. In particular, EC 125 may access EC region 200 of memory device 105 via bus 250 to retrieve a diagnostic file stored in EC region 200. In this embodiment, because EC 125 has identified that processor subsystem 120 is in an off state as described above, EC 125 may bypass bus 270 communicably coupling EC 125 to PCH 115, and instead access memory device 105 directly via bus 250. In this way, EC 125 does not require processor subsystem 120 and/or PCH 115 to be in an on state, or otherwise available, in order to access memory device 105. Rather, EC 125 may simply access EC region 200 of memory device 105 via bus 250 in a pre-POST environment.

In one embodiment, EC 125 may select a diagnostic file indicating the error associated with information handling system 100. As described above, respective errors determined by EC 125 may each be associated with a numeric error indicator. Similarly, respective diagnostic files stored in EC region 200 of memory device 105 may each be associated with a numeric value, or a "numeric diagnostic indicator." In one embodiment, EC 125 may use the numeric error indicators associated with respective errors and the numeric diagnostic indicators associated with respective diagnostic files to select a diagnostic file indicating the error associated with information handling system 100. In particular, EC 125 may identify a numeric error indicator associated with an error determined by EC 125. For example, EC 125 may execute a diagnostic test sequence that identifies one or more failures or issues associated with information handling system 100 and that outputs a numeric error indicator corresponding to the one or more failures or issues. Upon accessing EC region 200 of memory device 105, EC 125 may scan respective numeric diagnostic indicators corresponding to each diagnostic file stored in EC region 200 and may identify one or more diagnostic files having a numeric diagnostic indicator that corresponds to the numeric error indicator associated with the error. In one embodiment, EC 125 may select the one or more diagnostic files having the numeric diagnostic indicator that corresponds to the numeric error indicator upon determining that the numeric error indicator matches the numeric diagnostic indicator. In another embodiment, the numeric error indicator may be of an enumerated (enum) data type specifying a numeric enum value. In this embodiment, EC 125 may use the numeric enum value specified by the numeric error indicator to identify one or more diagnostic files stored in EC region 200 having a corresponding numeric enum value specified by the numeric diagnostic indicator.

In one embodiment, EC 125 may generate a verbalized diagnostic message based on one or more diagnostic files. Specifically, EC 125 may retrieve a diagnostic file, or diagnostic files, from memory device 105 (e.g., from EC region 200) via bus 250. For example, EC 125 may scan respective numeric diagnostic indicators corresponding to each diagnostic file stored in EC region 200 and may identify one or more diagnostic files having a numeric diagnostic indicator that matches the numeric error indicator corresponding to an error associated with information handling system 100. Once retrieved, EC 125 may store the diagnostic file, or diagnostic files, in memory 220 to generate a verbalized diagnostic message, or verbalized diagnostic messages, based on the diagnostic file, or diagnostic files. The verbalized diagnostic message, or verbalized diagnostic messages, generated by EC 125 may be or include a digital audio stream.

In one embodiment, EC 125 may retrieve a diagnostic text file, or diagnostic text files, from EC region 200 of memory device 105. In this embodiment, EC 125 may retrieve a diagnostic text file, or diagnostic text files, from EC region 200 of memory device 105 via bus 250 and may store the diagnostic text file, or diagnostic text files, in memory 220. EC 125 may additionally retrieve a speech synthesis engine, or a "text-to-speech (TTS) service," from EC region 200 of memory device 105 via bus 250 and may store the TTS service in memory 220. Once retrieved and stored in memory 220, EC 125 may execute the TTS service to convert normal language text into synthesized speech. Specifically, EC 125 may execute the TTS service using the diagnostic text file, or diagnostic text files, as input such that the TTS service may generate a verbalized diagnostic message, or verbalized diagnostic messages, as output. The verbalized diagnostic message, or verbalized diagnostic messages, generated by the TTS service may be or include a digital audio stream.

In one embodiment, EC 125 may retrieve a diagnostic audio file, or diagnostic audio files, from EC region 200 of memory device 105. In this embodiment, EC 125 may retrieve a diagnostic audio file, or diagnostic audio files, from EC region 200 of memory device 105 via bus 250 and may store the diagnostic audio file, or diagnostic audio files, in memory 220. EC 125 may additionally retrieve a digital audio file decoder engine, or an "audio file decoder service," from EC region 200 of memory device 105 via bus 250 and may store the audio file decoder service in memory 220. Once retrieved and stored in memory 220, EC 125 may execute the audio file decoder service to convert compressed digital audio into synthesized speech. In particular, EC 125 may execute the audio file decoder service using the diagnostic audio file, or diagnostic audio files, as input such that the audio file decoder service may generate a verbalized diagnostic message, or verbalized diagnostic messages, as output. The verbalized diagnostic message, or verbalized diagnostic messages, generated by the audio file decoder service may be or include a digital audio stream.

In one embodiment, EC 125 may send the verbalized diagnostic message to audio device 130. In particular, EC 125 may send the verbalized diagnostic message, or verbalized diagnostic messages, in an audio stream to audio device 130 via bus 260. In one embodiment, EC 125 may execute firmware instructions operable to bit the data transmission of the audio stream to audio device 130. In particular, EC 125 may toggle a signal being output from a general-purpose input/output (GPIO) pin of EC 125 in accordance with a sampling frequency specified by audio device 130 to send the vocalized diagnostic message, or vocalized diagnostic messages, to audio device 130 via bus 260. For example, EC 125 may toggle a signal being output from a PC_BEEP_IO GPIO pin of EC 125 in accordance with an 8 kilohertz (KHz) sampling frequency specified by audio device 130. In this way, EC 125 may send the verbalized diagnostic message, or verbalized diagnostic messages, to audio device 130 without requiring modification to existing architecture of information handling system 100. In another embodiment, bus 260 may be or include an I2S bus used to separate clock and serial data signals for communicating sequences of hexadecimal bytes comprising the audio stream to audio device 130. In yet another embodiment, bus 260 may be or include an I2C bus used to orchestrate a synchronous data transmission in which the transfer of bits comprising the audio stream may be sent to audio device 130 in accordance with a clock signal shared between EC 125 and audio device 130.

In one embodiment, upon receiving the verbalized diagnostic message, or verbalized diagnostic messages, from EC 125 via bus 260, audio device 130 may present the verbalized diagnostic message, or verbalized diagnostic messages, to the user via one or more speakers of information handling system 100. In the embodiment illustrated in FIG. 2, audio device 130 may present verbalized diagnostic messages to the user via speaker 290. In this way, information handling system 100 may audibly replicate, or otherwise generate, the sound of a human voice via one or more speakers (e.g., speaker 290) to explicitly convey instances of failures or issues associated with information handling system 100 during initialization, thereby avoiding cryptic flashes and/or beeps and improving overall user experience.

In one embodiment, processor subsystem 120 may be in an on state. In this embodiment, BIOS 110 may be executed by processor subsystem 120 in system memory 230. When executed, BIOS 110 may execute a diagnostic test sequence (e.g., a POST) and may identify that a failure or issue has occurred during a booting process. For example, BIOS 110 may execute a POST in a pre-OS environment and may identify that a display of information handling system 100 has experienced a failure or issue during initialization (i.e., no video) such that information handling system 100 may not complete a booting process. Based on results of the diagnostic testing sequence, BIOS 110 may determine an error associated with information handling system 100. In one embodiment, respective errors determined by BIOS 110 (e.g., based on the diagnostic testing sequence) may each be associated with a numeric error indicator. In this embodiment, BIOS 110 may use the numeric error indicators associated with respective errors, in part, to select a diagnostic file indicating the error associated with information handling system 100 to be presented to the user. Here, BIOS 110 may access memory device 105 via PCH 115 to retrieve a diagnostic file indicating the error associated with information handling system 100. In particular, BIOS 110 may access BIOS region 210 of memory device 105 via busses 280 and 250 to retrieve a diagnostic file stored in BIOS region 210.

In one embodiment, BIOS 110 may select a diagnostic file indicating the error associated with information handling system 100. As described above, respective errors determined by BIOS 110 may each be associated with a numeric error indicator. Similarly, respective diagnostic files stored in BIOS region 210 of memory device 105 may each be associated with a numeric diagnostic indicator. In one embodiment, BIOS 110 may use the numeric error indicators associated with respective errors and the numeric diagnostic indicators associated with respective diagnostic files to select a diagnostic file indicating the error associated with information handling system 100. In particular, BIOS 110 may identify a numeric error indicator associated with an error determined by BIOS 110. For example, BIOS 110 may execute a diagnostic test sequence that identifies one or more failures or issues associated with information handling system 100 and that outputs a numeric error indicator corresponding to the one or more failures or issues. Upon accessing BIOS region 210 of memory device 105, BIOS 110 may scan respective numeric diagnostic indicators corresponding to each diagnostic file stored in BIOS region 210 and may identify one or more diagnostic files having a numeric diagnostic indicator that corresponds to the numeric error indicator associated with the error. In one embodiment, BIOS 110 may select the one or more diagnostic files having the numeric diagnostic indicator that corresponds to the numeric error indicator upon determining that the numeric error indicator matches the numeric diagnostic indicator. In another embodiment, the numeric error indicator may be of an enumerated (enum) data type specifying a numeric enum value. In this embodiment, BIOS 110 may use the numeric enum value specified by the numeric error indicator to identify one or more diagnostic files stored in BIOS region 210 having a corresponding numeric enum value specified by the numeric diagnostic indicator.

In one embodiment, BIOS 110 may generate a verbalized diagnostic message based on one or more diagnostic files. Specifically, BIOS 110 may retrieve a diagnostic file, or diagnostic files, from memory device 105 (e.g., from BIOS region 210) via PCH 115. For example, BIOS 110 may scan respective numeric diagnostic indicators corresponding to each diagnostic file stored in BIOS region 210 and may identify one or more diagnostic files having a numeric diagnostic indicator that matches the numeric error indicator corresponding to an error associated with information handling system 100. Once retrieved, BIOS 110 may store the diagnostic file, or diagnostic files, in system memory 230 to generate a verbalized diagnostic message, or verbalized diagnostic messages, based on the diagnostic file, or diagnostic files. The verbalized diagnostic message, or verbalized diagnostic messages, generated by BIOS 110 may be or include a digital audio stream. In one embodiment, the verbalized diagnostic message, or verbalized diagnostic messages, generated by BIOS 110 may be presented to a user of information handling system 100 to provide an audible guided BIOS recovery process for the user. In this embodiment, BIOS 110 may generate multiple verbalized diagnostic messages to be presented to the user in series, where each verbalized diagnostic message comprises a step within the overall BIOS recovery process.

In one embodiment, BIOS 110 may retrieve a diagnostic text file, or diagnostic text files, from BIOS region 210 of memory device 105. In this embodiment, BIOS 110 may retrieve a diagnostic text file, or diagnostic text files, from BIOS region 210 of memory device 105 via PCH 115 and may store the diagnostic text file, or diagnostic text files, in system memory 230. BIOS 110 may additionally retrieve a TTS service from BIOS region 210 of memory device 105 via PCH 115 and may store the TTS service in system memory 230. Once retrieved and stored in system memory 230, BIOS 110 may execute the TTS service to convert normal language text into synthesized speech. In particular, BIOS 110 may execute the TTS service using the diagnostic text file, or diagnostic text files, as input such that the TTS service may generate a verbalized diagnostic message, or verbalized diagnostic messages, as output. The verbalized diagnostic message, or verbalized diagnostic messages, generated by the TTS service may be or include a digital audio stream.

In one embodiment, BIOS 110 may retrieve a diagnostic audio file, or diagnostic audio files, from BIOS region 210 of memory device 105. In this embodiment, BIOS 110 may retrieve a diagnostic audio file, or diagnostic audio files, from BIOS region 210 of memory device 105 via PCH 115 and may store the diagnostic audio file, or diagnostic audio files, in system memory 230. BIOS 110 may additionally retrieve an audio file decoder service from BIOS region 210 of memory device 105 via PCH 115 and may store the audio file decoder service in system memory 230. Once retrieved and stored in system memory 230, BIOS 110 may execute the audio file decoder service to convert compressed digital audio into synthesized speech. Specifically, BIOS 110 may execute the audio file decoder service using the diagnostic audio file, or diagnostic audio files, as input such that the audio file decoder service may generate a verbalized diagnostic message, or verbalized diagnostic messages, as output. The verbalized diagnostic message, or verbalized diagnostic messages, generated by the audio file decoder service may be or include a digital audio stream.

In one embodiment, BIOS 110 may send the verbalized diagnostic message to audio device 130. In particular, BIOS 110 may send the verbalized diagnostic message, or verbalized diagnostic messages, in an audio stream to audio device 130 via PCH 115. Upon receiving the verbalized diagnostic message, or verbalized diagnostic messages, from BIOS 110 via PCH 115, audio device 130 may present the verbalized diagnostic message, or verbalized diagnostic messages, to the user via one or more speakers of information handling system 100. In the embodiment illustrated in FIG. 2, audio device 130 may present verbalized diagnostic messages to the user via speaker 290. In this way, information handling system 100 may audibly replicate, or otherwise generate, the sound of a human voice via one or more speakers (e.g., speaker 290) to explicitly provide a guided BIOS recovery process for the user and/or to convey instances of failures or issues associated with information handling system 100 during initialization, thereby avoiding cryptic flashes and/or beeps and improving overall user experience.

Figure 3:
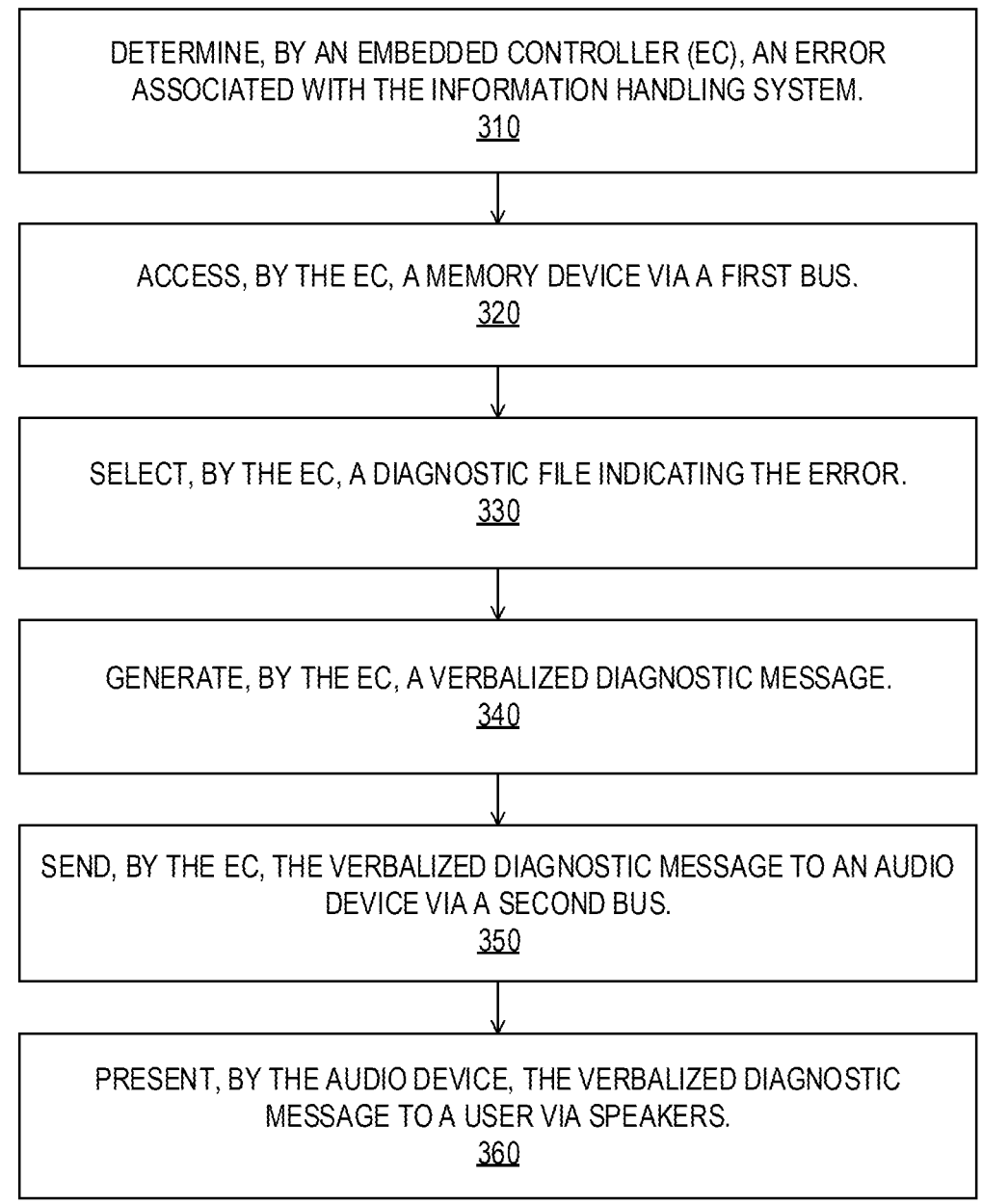
FIG. 3 is a flowchart depicting selected elements of an embodiment of a method for providing a verbalized diagnostic message generated by an embedded controller (EC) to a user of an information handling system.

FIG. 3 is a flowchart depicting selected elements of an embodiment of a method for providing a verbalized diagnostic message generated by an embedded controller (EC) to a user of an information handling system. It is noted that certain operations described in method 300 may be optional or may be rearranged in different embodiments.

Method 300 may begin at step 310, where an EC of the information handling system may determine an error associated with the information handling system. For example, EC 125 may execute a diagnostic test sequence that identifies one or more failures or issues associated with information handling system 100 and that outputs a numeric error indicator corresponding to the one or more failures or issues as described above with respect to FIG. 2. In step 320, the EC may access a memory device of the information handling system via a first bus communicably coupling the EC to the memory device. The memory device may be used to store diagnostic files. For example, EC 125 may access EC region 200 of memory device 105 via bus 250 to retrieve a diagnostic file stored in EC region 200 as described above with respect to FIG. 2. In this example, EC 125 may bypass bus 270 communicably coupling EC 125 to PCH 115, and instead access memory device 105 directly via bus 250. In step 330, the EC may select a diagnostic file from the diagnostic files stored in the memory device. The diagnostic file may indicate the error associated with the information handling system. For example, EC 125 may scan respective numeric diagnostic indicators corresponding to each diagnostic file stored in EC region 200 and may identify one or more diagnostic files having a numeric diagnostic indicator that corresponds to the numeric error indicator associated with the error as described above with respect to FIG. 2. In one embodiment, EC 125 may select the one or more diagnostic files having the numeric diagnostic indicator that corresponds to the numeric error indicator upon determining that the numeric error indicator matches the numeric diagnostic indicator. In step 340, the EC may generate a verbalized diagnostic message. For example, EC 125 may retrieve a diagnostic file, or diagnostic files, from memory device 105 (e.g., from EC region 200) via bus 250 and may store the diagnostic file, or diagnostic files, in memory 220 to generate a verbalized diagnostic message, or verbalized diagnostic messages, based on the diagnostic file, or diagnostic files as described above with respect to FIG. 2. The verbalized diagnostic message, or verbalized diagnostic messages, generated by EC 125 may be or include a digital audio stream. In step 350, the EC may send the verbalized diagnostic message to an audio device of the information handling system in an audio stream via a second bus communicably coupling the EC to the audio device. For example, EC 125 may toggle a signal being output from a general-purpose input/output (GPIO) pin of EC 125 in accordance with a sampling frequency specified by audio device 130 to send the vocalized diagnostic message, or vocalized diagnostic messages, to audio device 130 via bus 260 as described above with respect to FIG. 2. In step 360, the audio device may present the verbalized diagnostic message to a user via one or more speakers of the information handling system. For example, audio device 130 may present verbalized diagnostic messages to the user via speaker 290 as described above with respect to FIG. 2.

Figure 4:
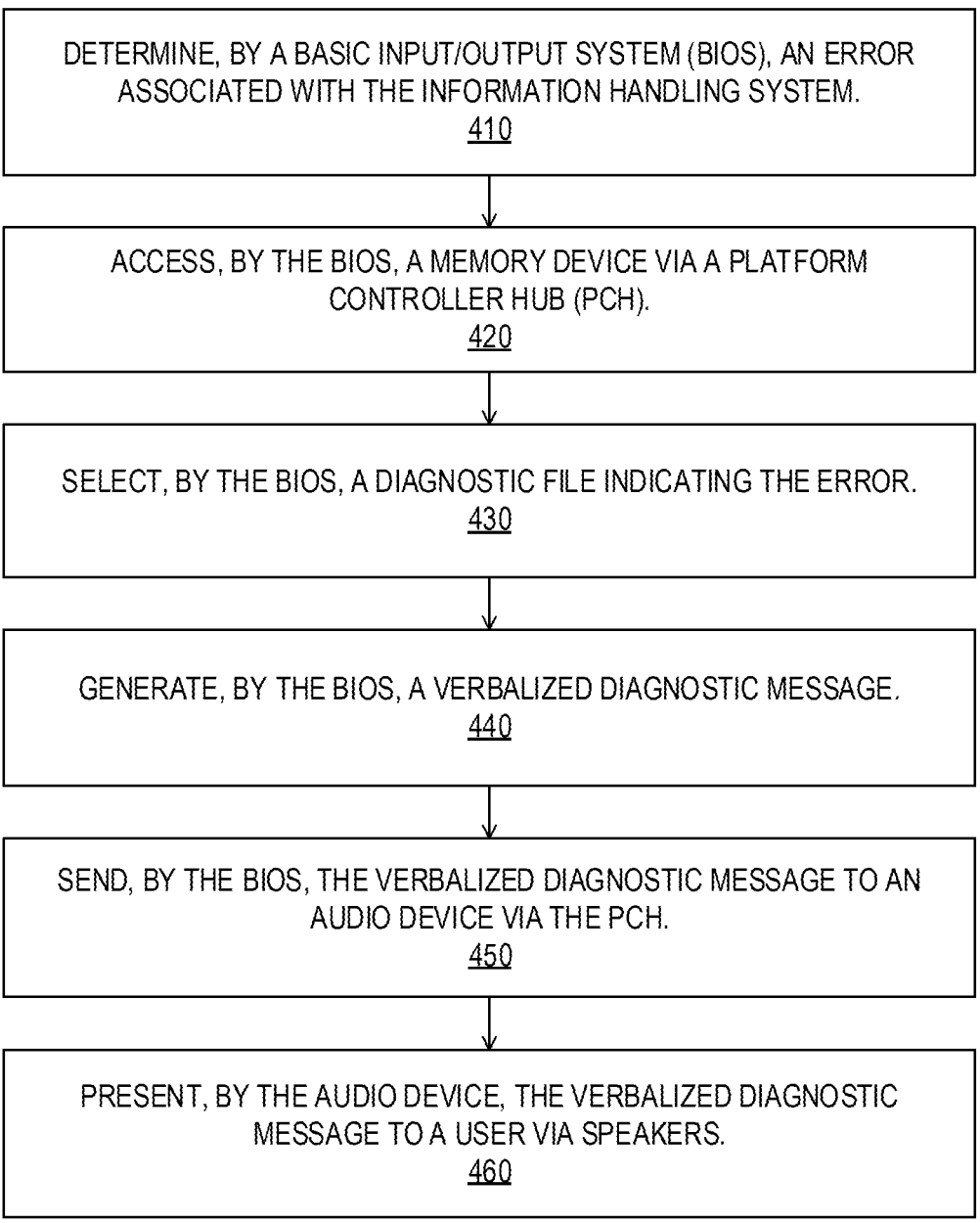
FIG. 4 is a flowchart depicting selected elements of an embodiment of a method for providing a verbalized diagnostic message generated by a basic input/output system (BIOS) to a user of an information handling system.

FIG. 4 is a flowchart depicting selected elements of an embodiment of a method for providing a verbalized diagnostic message generated by a basic input/output system (BIOS) to a user of an information handling system. It is noted that certain operations described in method 400 may be optional or may be rearranged in different embodiments.

Method 400 may begin at step 410, where BIOS may determine an error associated with the information handling system. For example, BIOS 110 may execute a diagnostic test sequence that identifies one or more failures or issues associated with information handling system 100 and that outputs a numeric error indicator corresponding to the one or more failures or issues as described above with respect to FIG. 2. In step 420, the BIOS may access a memory device of the information handling system via a platform controller hub (PCH). The memory device may be used to store diagnostic files. For example, BIOS 110 may access memory device 105 via PCH 115 to retrieve a diagnostic file indicating the error associated with information handling system 100 as described above with respect to FIG. 2. In step 430, the BIOS may select a diagnostic file from the diagnostic files stored in the memory device. The diagnostic file may indicate the error associated with the information handling system. For example, BIOS 110 may scan respective numeric diagnostic indicators corresponding to each diagnostic file stored in BIOS region 210 and may identify one or more diagnostic files having a numeric diagnostic indicator that corresponds to the numeric error indicator associated with the error as described above with respect to FIG. 2. In one embodiment, BIOS 110 may select the one or more diagnostic files having the numeric diagnostic indicator that corresponds to the numeric error indicator upon determining that the numeric error indicator matches the numeric diagnostic indicator. In step 440, the BIOS may generate a verbalized diagnostic message. For example, BIOS 110 may retrieve a diagnostic file, or diagnostic files, from memory device 105 (e.g., from BIOS region 210) via PCH 115 and may store the diagnostic file, or diagnostic files, in system memory 230 to generate a verbalized diagnostic message, or verbalized diagnostic messages, based on the diagnostic file, or diagnostic files as described above with respect to FIG. 2. The verbalized diagnostic message, or verbalized diagnostic messages, generated by BIOS 110 may be or include a digital audio stream. In step 450, the BIOS may send the verbalized diagnostic message to an audio device of the information handling system in an audio stream. For example, BIOS 110 may send the verbalized diagnostic message, or verbalized diagnostic messages, in an audio stream to audio device 130 via PCH 115 as described above with respect to FIG. 2. In step 460, the audio device may present the verbalized diagnostic message to a user via one or more speakers of the information handling system. For example, audio device 130 may present verbalized diagnostic messages to the user via speaker 290 as described above with respect to FIG. 2.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated other-wise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method for providing a verbalized diagnostic message to a user of an information handling system, the method comprising:
   determining, by an embedded controller (EC) of the information handling system, an error associated with the information handling system;
   accessing, by the EC, a memory device of the information handling system via a first bus and bypassing a second bus communicably coupling the EC to a platform controller hub (PCH) of the information handling system, the memory device storing a plurality of diagnostic files, the first bus communicably coupling the EC to the memory device;
   selecting, by the EC, a diagnostic file from the plurality of diagnostic files, the diagnostic file indicating the error associated with the information handling system;
   generating, by the EC, the verbalized diagnostic message;
   sending, by the EC, the verbalized diagnostic message to an audio device of the information handling system in an audio stream via a third bus, the third bus communicably coupling the EC to the audio device; and
   presenting, by the audio device, the verbalized diagnostic message to the user via one or more speakers of the information handling system.

2. The method of claim 1, wherein each of the plurality of diagnostic files comprises a diagnostic text file.

3. The method of claim 2, wherein generating the verbalized diagnostic message comprises:
   retrieving, by the EC, the diagnostic text file and a text-to-speech (TTS) service from an EC region of the memory device via the first bus;
   storing, by the EC, the diagnostic text file and the TTS service in a memory of the EC; and
   executing, by the EC, the TTS service using the diagnostic text file as input, the TTS service generating the verbalized diagnostic message as output.

4. The method of claim 1, wherein each of the plurality of diagnostic files comprises a diagnostic audio file.

5. The method of claim 4, wherein generating the verbalized diagnostic message comprises:
   retrieving, by the EC, the diagnostic audio file and an audio file decoder service from an EC region of the memory device via the first bus;
   storing, by the EC, the diagnostic audio file and the audio file decoder service in a memory of the EC; and
   executing, by the EC, the audio file decoder service using the diagnostic audio file as input, the audio file decoder service generating the verbalized diagnostic message as output.

6. The method of claim 1, wherein selecting the diagnostic file from the plurality of diagnostic files comprises:
   identifying, by the EC, a numeric error indicator associated with the error;
   identifying, by the EC, a numeric diagnostic indicator associated with the diagnostic file; and
   determining, by the EC, that the numeric error indicator matches the numeric diagnostic indicator.

7. The method of claim 1, wherein determining the error associated with the information handling system comprises:
   determining, by the EC, that a processor subsystem of the information handling system is in an off state; and
   executing, by the EC, a diagnostic test sequence stored in a memory of the EC, the diagnostic test sequence indicating the error associated with the information handling system.

8. One or more computer-readable non-transitory storage media embodying software that is operable when executed to:
   determine, by an embedded controller (EC) of the information handling system, an error associated with the information handling system;
   access, by the EC, a memory device of the information handling system via a first bus and bypassing a second bus communicably coupling the EC to a platform controller hub (PCH) of the information handling system, the memory device storing a plurality of diagnostic files, the first bus communicably coupling the EC to the memory device;
   select, by the EC, a diagnostic file from the plurality of diagnostic files, the diagnostic file indicating the error associated with the information handling system;
   generate, by the EC, the verbalized diagnostic message;
   send, by the EC, the verbalized diagnostic message to an audio device of the information handling system in an audio stream via a third bus, the third bus communicably coupling the EC to the audio device; and
   present, by the audio device, the verbalized diagnostic message to the user via one or more speakers of the information handling system.

9. The media of claim 8, wherein each of the plurality of diagnostic files comprises a diagnostic text file.

10. The media of claim 9, wherein to generate the verbalized diagnostic message, the software is further operable when executed to:
    retrieve, by the EC, the diagnostic text file and a text-to-speech (TTS) service from an EC region of the memory device via the first bus;
    store, by the EC, the diagnostic text file and the TTS service in a memory of the EC; and
    execute, by the EC, the TTS service using the diagnostic text file as input, the TTS service generating the verbalized diagnostic message as output.

11. The media of claim 8, wherein each of the plurality of diagnostic files comprises a diagnostic audio file.

12. The media of claim 11, wherein to generate the verbalized diagnostic message, the software is further operable when executed to:
    retrieve, by the EC, the diagnostic audio file and an audio file decoder service from an EC region of the memory device via the first bus;
    store, by the EC, the diagnostic audio file and the audio file decoder service in a memory of the EC; and
    execute, by the EC, the audio file decoder service using the diagnostic audio file as input, the audio file decoder service generating the verbalized diagnostic message as output.

13. The media of claim 8, wherein to select the diagnostic file from the plurality of diagnostic files, the software is further operable when executed to:
    identify, by the EC, a numeric error indicator associated with the error;
    identify, by the EC, a numeric diagnostic indicator associated with the diagnostic file; and
    determine, by the EC, that the numeric error indicator matches the numeric diagnostic indicator.

14. The media of claim 8, wherein determining the error associated with the information handling system comprises:
    determining, by the EC, that a processor subsystem of the information handling system is in an off state; and executing, by the EC, a diagnostic test sequence stored in a memory of the EC, the diagnostic test sequence indicating the error associated with the information handling system.

15. A computing environment, comprising:

an information handling system including one or more processors; and one or more computer-readable non-transitory storage media coupled to one or more of the processors and comprising instructions operable when executed by one or more of the processors to cause the system to:

determine, by an embedded controller (EC) of the information handling system, an error associated with the information handling system;

access, by the EC, a memory device of the information handling system via a first bus and bypassing a second bus communicably coupling the EC to a platform controller hub (PCH) of the information handling system, the memory device storing a plurality of diagnostic files, the first bus communicably coupling the EC to the memory device;

select, by the EC, a diagnostic file from the plurality of diagnostic files, the diagnostic file indicating the error associated with the information handling system;

generate, by the EC, the verbalized diagnostic message;

send, by the EC, the verbalized diagnostic message to an audio device of the information handling system in an audio stream via a third bus, the third bus communicably coupling the EC to the audio device; and present, by the audio device, the verbalized diagnostic message to the user via one or more speakers of the information handling system.

16. The computing environment of claim 15, wherein each of the plurality of diagnostic files comprises a diagnostic text file.

17. The computing environment of claim 16, wherein to generate the verbalized diagnostic message, the processors are further operable when executed to:

retrieve, by the EC, the diagnostic text file and a text-to-speech (TTS) service from an EC region of the memory device via the first bus;

store, by the EC, the diagnostic text file and the TTS service in a memory of the EC; and execute, by the EC, the TTS service using the diagnostic text file as input, the TTS service generating the verbalized diagnostic message as output.

18. The computing environment of claim 15, wherein each of the plurality of diagnostic files comprises a diagnostic audio file.

* * * * *